No. 698,599. Patented Apr. 29, 1902.
W. R. WAKEFIELD.
MACHINE FOR FORMING BRICKS, TILE, &c.
(Application filed Oct. 29, 1901.)
(No Model.) 7 Sheets—Sheet 1.

Witnesses
H. L. Amer
W. Schmidt

Inventor
William R. Wakefield,
By Victor J. Evans
Attorney

No. 698,599. Patented Apr. 29, 1902.
W. R. WAKEFIELD.
MACHINE FOR FORMING BRICKS, TILE, &c.
(Application filed Oct. 29, 1901.)

(No Model.) 7 Sheets—Sheet 3.

Fig. 3.

Witnesses
H. L. Ames,
H. Schmidt.

Inventor
William R. Wakefield.
By Victor J. Evans
Attorney

No. 698,599. Patented Apr. 29, 1902.
W. R. WAKEFIELD.
MACHINE FOR FORMING BRICKS, TILE, &c.
(Application filed Oct. 29, 1901.)

(No Model.) 7 Sheets—Sheet 5.

Witnesses
H. L. Ames.
H. Schmidt.

Inventor
William R. Wakefield,
By Victor J. Evans
Attorney

No. 698,599. Patented Apr. 29, 1902.
W. R. WAKEFIELD.
MACHINE FOR FORMING BRICKS, TILE, &c.
(Application filed Oct. 29, 1901.)

(No Model.) 7 Sheets—Sheet 6.

Witnesses
H. L. Amer.
H. Schmidt.

Inventor
William R. Wakefield.
By Victor J. Evans
Attorney.

UNITED STATES PATENT OFFICE.

WILLIAM R. WAKEFIELD, OF MOUNT UNION, PENNSYLVANIA.

MACHINE FOR FORMING BRICKS, TILE, &c.

SPECIFICATION forming part of Letters Patent No. 698,599, dated April 29, 1902.

Application filed October 29, 1901. Serial No. 80,468. (No model.)

*To all whom it may concern:*

Be it known that I, WILLIAM R. WAKEFIELD, a citizen of the United States, residing at Mount Union, in the county of Huntingdon and State of Pennsylvania, have invented certain new and useful Improvements in Machines for Forming Bricks, Tile, &c.; and I do hereby declare the following to be a full, clear, and exact description of the invention, such as will enable others skilled in the art to which it appertains to make and use the same.

This invention relates to a machine for forming bricks, tile, and other building or decorative blocks; and the primary object thereof is to construct a device which will automatically deposit the material into molds and convey them to a table or support, from where said molds may be conveniently removed.
A further object is to finish the brick or block as it passes through the machine within the mold.

A still further object is to provide a simple and effective means for throwing part of the machine out of operation without affecting the operation of the remaining part.

Further objects, as well as the novel details of construction, will be clearly described hereinafter and illustrated in the accompanying drawings, in which—

Fig. 3 is a vertical longitudinal sectional view through the same.
Fig. 7 is a detail perspective view of the packing-plunger.
Fig. 11 is a perspective view of one of the mold-boxes.

Throughout the specification the machine will be referred to as a "brick-machine," as it is contemplated to employ the device for this purpose preferably; but as the construction and nature of the invention becomes more apparent it will be obvious that the machine may be employed for a multiplicity of purposes in which a mold is employed. Therefor the terms "brick-machine" and "bricks" are used for the purpose of convenience in disclosing the construction and operation of the device.

The reference-numeral 1 designates a base rectangular in form and supported in suitable standards 2, whereby said base is raised above the ground or other support. Superimposed above the base is a gearing-frame 3, supported on standards 4, which are conveniently secured to the sides of the base 1 in any convenient manner. Intermediate the ends of the gearing-frame is a transverse shaft 5, which is mounted in suitable bearings 6 and 7 on the side rails of the gearing-frame, and on one end of said shaft is a drive-pulley 8, from which the machine receives its power. On the opposite end of the shaft 5 is a sprocket-wheel 9, while a pinion 10 is keyed to the shaft 5 on the opposite side of the said frame and is located intermediate the bearing and the drive-pulley 8. This pinion 10 meshes with the gear-wheel 11, mounted on a stub-shaft 12, on which is loosely secured a sprocket-wheel 13, driving a chain 14, which engages a sprocket-wheel 15, keyed to a transverse shaft 16 at one end of the machine, on which are provided intermediate sprockets 17 and 18 for actuating the conveyer, to be hereinafter described. On the opposite end of the machine is a similar shaft, (designated by the reference-numeral 19,) carrying sprockets 20 and 21, similar to those designated by the reference-numerals 17 and 18 and spaced the same distance apart, whereby the conveyer may move idly on said sprockets during the process of conveying the molds, as will be described hereinafter. On the stub-shaft 12 is a clutch 22, adapted to be actuated by a clutch-lever 23, whereby the sprocket 13 may be thrown out of engagement with the gear-wheel 11, thereby stopping the conveyer.

Figure 8:
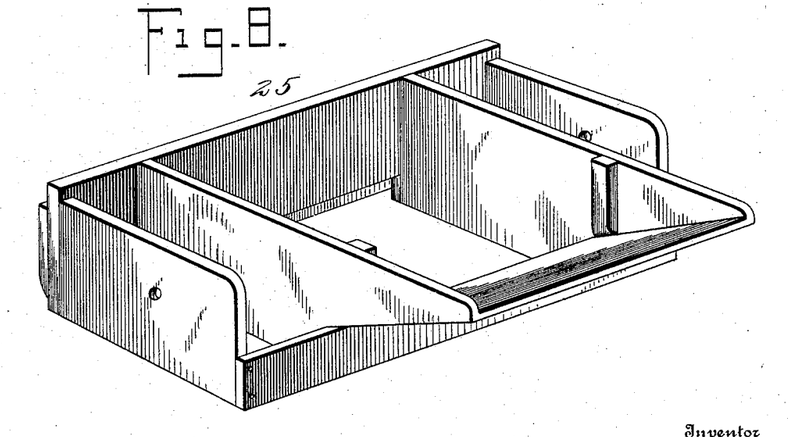
Fig. 8 is a like view of the hopper for receiving and conveying material.

Mounted in slots 24 in the standards 4 at one end of the machine, termed the "front," is a hopper 25, which may be adjusted vertically with relation to the molds, it being understood that molds of varying heights or depths may be used. A reciprocating plunger 26 works vertically within the hopper and forces the clay or other material into the molds as they are carried under the hopper 25 to be filled. This plunger is actuated by a revoluble disk 27, to which the plunger-rod 28 is eccentrically pivoted by a suitable wrist-pin of approved construction. The plunger-rod is in two sections, the lower one being pivoted to the plunger and sleeved over the upper section. A spring 29 is coiled around the upper section and bears against the top of the lower one to form a buffer, whereby a resilient pressure will be provided.

Figures 1, 15:
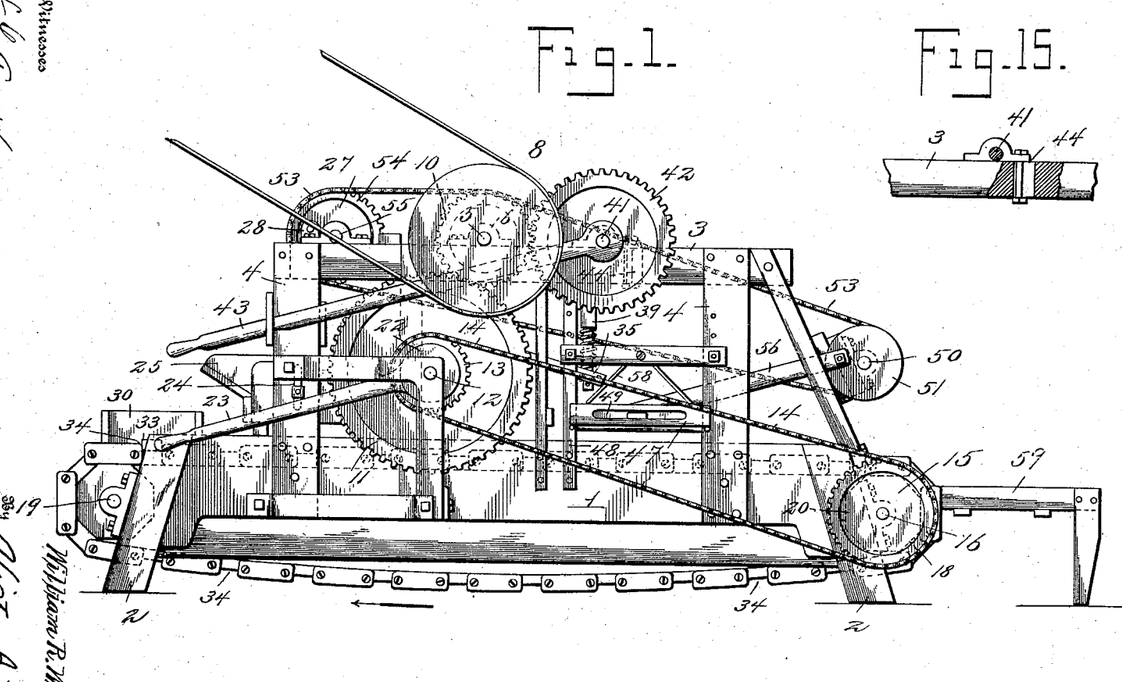
Figure 1 is a side elevation of a machine constructed in accordance with my invention.
Fig. 15 is a detail sectional view of a sliding bearing.
Figure 2:
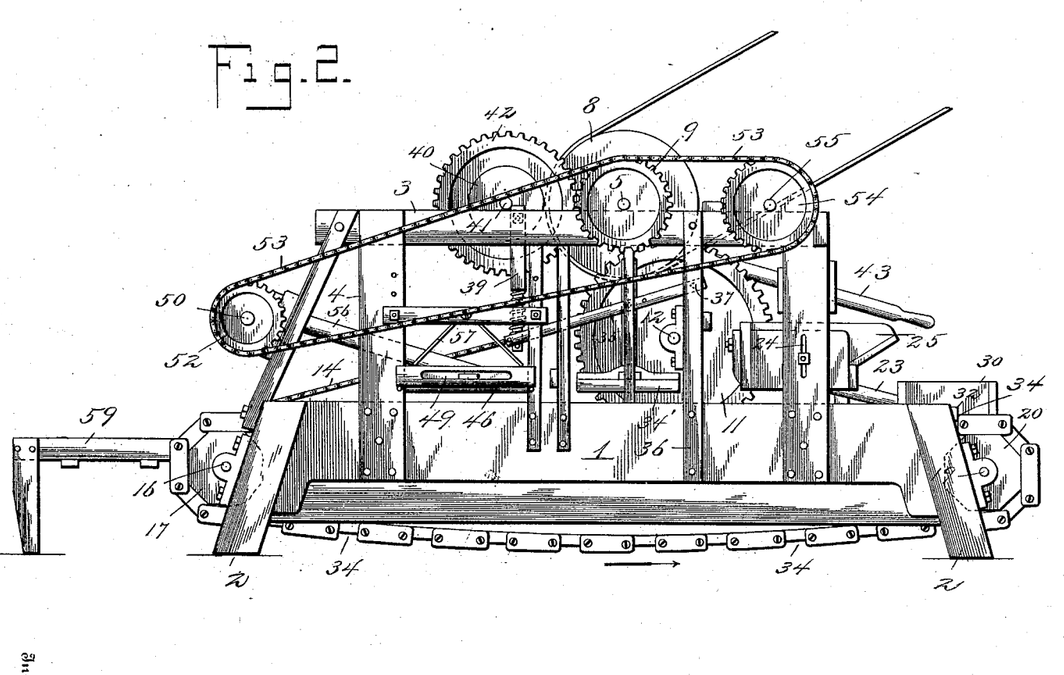
Fig. 2 is a similar view of the opposite side.
Figure 3:
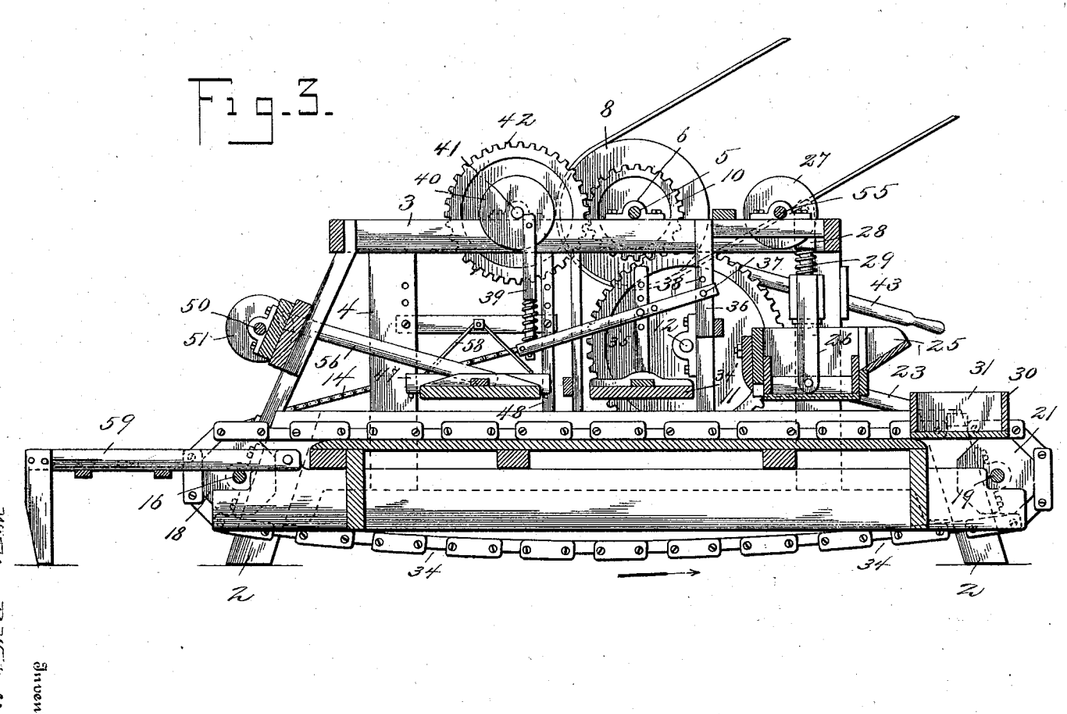
Figure 4:
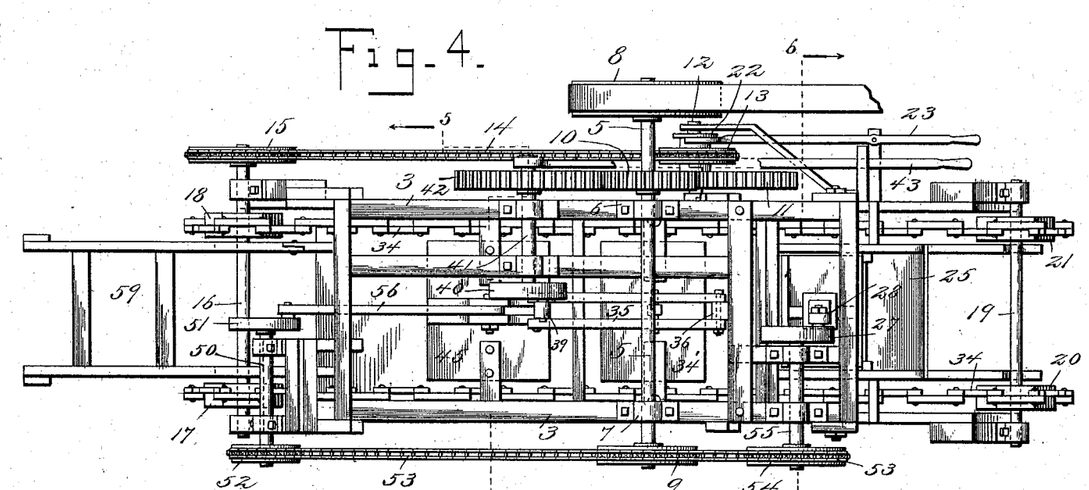
Fig. 4 is a top plan view of the machine.
Figure 5:
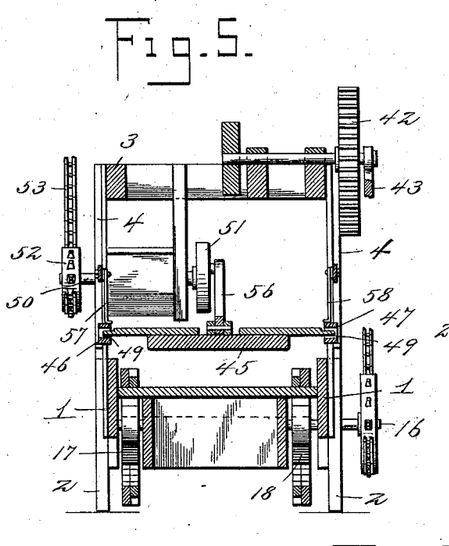
Fig. 5 is a transverse section on the line 5 5 of Fig. 4.
Figure 6:
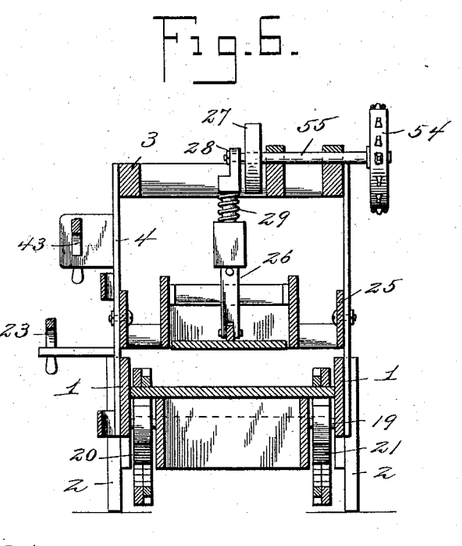
Fig. 6 is a similar view on the line 6 6 of Fig 4.
Figure 7:
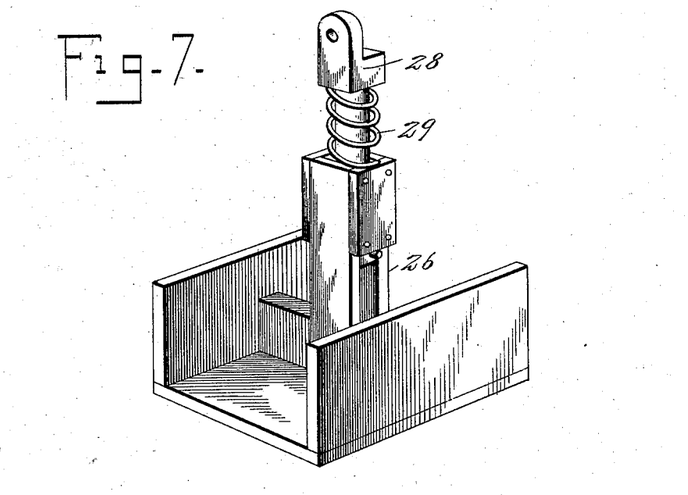
Figure 11:
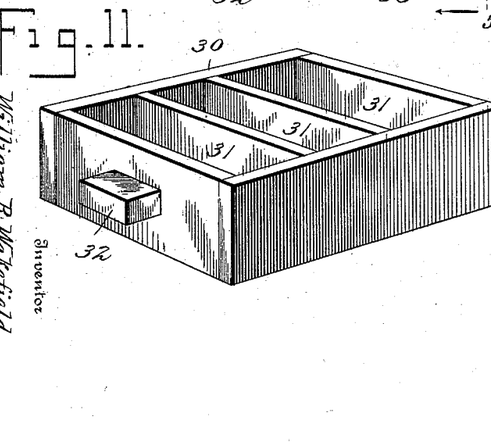
Figure 14:
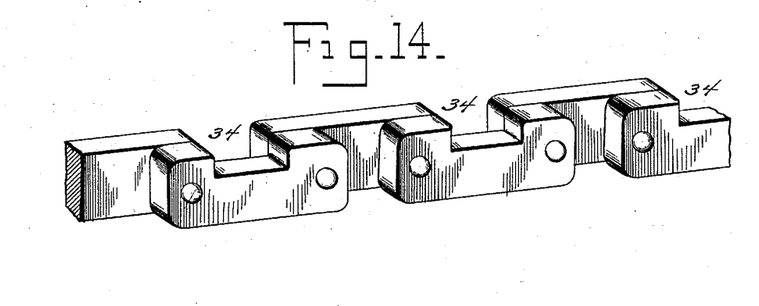
Fig. 14 is a fragmentary perspective view of the conveyer-chain.

The mold (designated by the reference-numeral 30) is in the form of a rectangular box and is partitioned into a plurality of compartments 31, whereby a number of bricks may be molded at a single operation of the plunger. On opposite sides or ends of the mold 30 are two horizontally-projecting lugs 32 and 33, which are adapted to engage cut-out portions 34 in the links of the conveyer. As each alternating link is provided with one of these cut-out portions, a number of molds may be carried by the conveyer equal to the number of strokes of the plunger 26. After the mold has been conveyed past the hopper the clay or other material is pressed firmly into place by a second plunger 34', which is positioned about midway the machine and is adjustably secured to an approximately horizontal bar 35, pivoted at one end to a vertical bar 36 through the medium of a pin 37, adapted to be inserted in one of a plurality of perforations 38, which also affords an adjustment. The opposite end of the lever is resiliently secured to a pitman 39, eccentrically fastened to a disk 40, driven by a shaft 41, on which is a gear-wheel 42, meshing with the pinion 10. A shifting-lever 43 is connected to the shaft 41, which rests in sliding bearings 44. By pushing upon the lever 43 the gear 42 may be thrown out of engagement with the pinion 10 and the operation of the second plunger will cease irrespective of the operation of the remainder of the machine.

Figure 9:
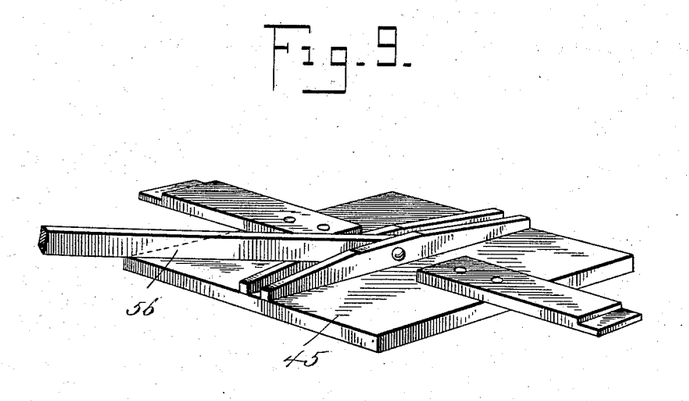
Fig. 9 is a perspective view of the reciprocating finishing-trowel.
Figure 10:
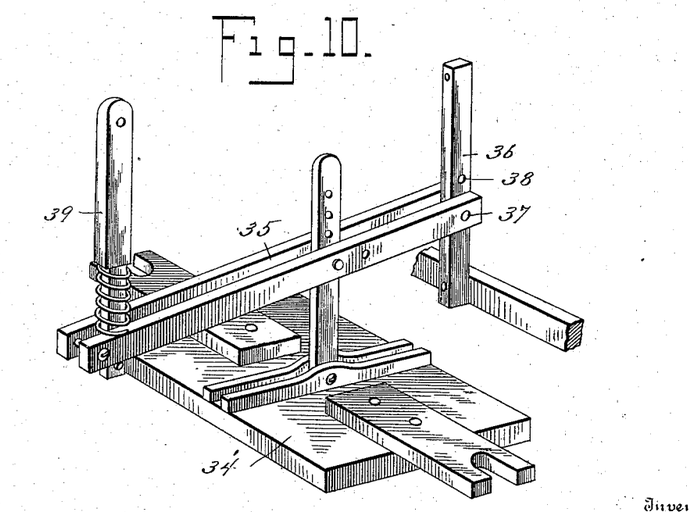
Fig. 10 is a similar view of the pressure-plunger.

The reference-numeral 45 designates a reciprocating finishing-trowel which is located at the end of the machine farthest removed from the hopper and so designed for the purpose of smoothing the bricks after they pass the second plunger.

Figure 13:
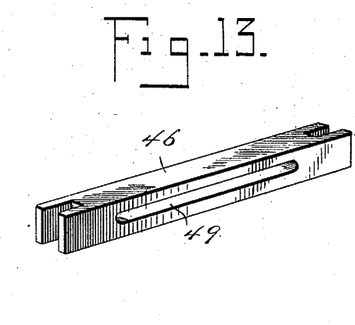
Fig. 13 is a like view of one of the guides and supporting-bars therefor.

Suitable vertically-adjustable guides 46 and 47 are arranged on the standards 4 and vertical supports 48 and are provided with longitudinal slots 49, in which the trowel reciprocates. A stud-shaft 50 is carried by the gear-frame at the rear end of the machine, on one end of which is a disk 51, while on the other end is a sprocket-wheel 52, driven by a chain 53, which passes over the wheel 52 and a sprocket 54 on a stud-shaft 55, which drives the disk provided to actuate the plunger 26.

Figure 12:
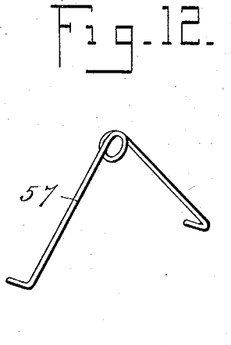
Fig. 12 is a like view of the spring for pressing the trowel.

The reference-numeral 56 designates a pitman which is connected to the disk 51 and to the sliding trowel, whereby said trowel will be actuated and caused to pass back and forth over the mold, thus producing a finished effect to the bricks. In order to cause the trowel to be in close proximity to the top of the mold, I arrange two inverted-V-shaped springs 57 and 58 above the trowel-guides, which bear upon the same. While these springs will take up any inequality between the molds and the trowel, they will cause the trowel to at all times rest firmly upon the same.

At the rear end of the machine is arranged a table 59, upon which the molds are deposited as they leave the conveyer and from where they are removed to the kiln to be baked or dried.

In the operation of the machine it is to be understood that clay is to be fed into the hopper in any convenient manner from a chute or other conveyer. When motion is imparted to the drive-wheel, the remaining gearing is actuated, thereby imparting motion to the rest of the machine. As the material is fed into the hopper the molds are placed upon the conveyer, so as to bring them opposite the hopper during the downstroke of the plunger, causing said molds to be filled with the clay. As the conveyer moves rearward the mold is carried to the second plunger, which is the packing-plunger and which packs the material into the compartments of the mold. As the first mold reaches the packing-plunger a second mold is being filled by the feed-plunger from the hopper. The first mold is next conveyed to the reciprocating trowel, where the tops of the bricks are smoothed to present a finished appearance, and the second mold will have reached the packing-plunger and a third mold will be in position under the hopper. These operations are synchronous and will be carried on successively, the operator feeding additional molds onto the conveyer at determined intervals, so that a mold will be under the hopper, the packing-plunger, and the trowel at all times. As the molds leave the finishing-trowel they will be conveyed to the table and released, owing to the peculiar construction of the links and the means on the molds for engaging the same.

It will of course be obvious that suitable designs may be embossed or molded upon the bricks, if desired, by inserting fanciful dies in the bottom of the molds.

While I have specifically described what to me at this time appears to be the very best means of accomplishing the desired result, I do not limit myself to the exact details of construction or arrangement of parts, but reserve the right to make such changes and alterations as I may find convenient from time to time and without departing from the spirit of my invention.

Having thus fully described my invention, what I claim, and desire to secure by Letters Patent, is—

1. The combination with a suitable gearing, of a hopper arranged adjacent thereto, a plunger reciprocating in said hopper, a conveyer beneath the hopper and molds carried thereby, said plunger being adapted to be actuated by the gearing, a second plunger arranged near the first plunger, and a smoothing-trowel adapted to be reciprocated over the top of the mold.

2. The combination with a gearing, of the conveyer arranged beneath the same, molds traveling on said conveyer, a hopper arranged above the same, a plunger working in said hopper adapted to force material into the molds, and a finishing-trowel actuated by the gearing adapted to pass over the molds to give a finished appearance to the molded articles.

3. The combination with a horizontally-arranged conveyer and molds carried thereby, of a hopper arranged above the conveyer, means for forcing material from the hopper into the molds, means for packing the material after the molds leave the hopper, and a spring-pressed laterally-moving device for smoothing off the top of the material within the mold.

4. The combination with the conveyer and molds carried thereby, of a feed device arranged above the molds and adapted to fill the same, a resiliently-mounted packing device positioned above the conveyer and adapted to pack the material within the molds, and an adjustable finishing-trowel arranged adjacent the packing-plunger and adapted to bear upon and reciprocate over the top edges of the mold.

5. The combination with a conveyer consisting of links, the alternate links of which are provided with cut-out portions, of a mold adapted to be carried by said conveyer, oppositely-disposed lugs or projections on the outer walls of said mold and adapted to engage the cut-out portions of the links, means for filling the mold arranged above the conveyer, and a resilient smoothing device adapted to reciprocate and bear upon the top edges of the mold.

6. The combination with a conveyer comprising chains, the alternate links of which are provided with cut-out portions, a mold adapted to be carried by said conveyer, lugs or projections on the mold adapted to engage the cut-out portions of the links whereby the mold will be released at the end of the conveyer, and means for packing material within the molds.

7. The combination with a conveyer and a mold carried thereby, of means for packing material into the mold, and a reciprocating spring-pressed finishing-trowel adapted to reciprocate over the top of the mold after the material has been packed thereinto.

8. The combination with a conveyer ad an mold carried thereby, a feed mechanism arranged above the conveyer and adapted to feed material into the mold, a packing-plunger arranged adjacent the feed mechanism and a finishing device arranged adjacent the packing-plunger, and a gearing connected to the feed mechanism, packing-plunger and finishing device.

9. The combination with a conveyer and a removable mold carried thereby, a feeding device above the mold, a packing-plunger arranged adjacent thereto and adjustably supported above the conveyer and the spring-pressed and adjustable finishing device adapted to bear upon the top of the mold and reciprocate thereon.

10. The combination with a conveyer, of a mold carried thereby, a hopper arranged above the mold, a resiliently-mounted plunger reciprocating in the hopper and adapted to feed material into the mold, means for packing material into the mold and an adjustable spring-pressed and reciprocating finishing device adapted to bear upon the top of the mold for the purpose described.

11. The combination with a conveyer and a mold carried thereby, of a feed device arranged above the mold and adapted to fill the same, means for packing the material into the mold and an adjustable spring-pressed finishing device adapted to reciprocate and bear upon the top of the mold as it is moved by the conveyer.

12. The combination with a mold, a feed device adapted to empty into the mold and a spring-pressed finishing device adapted to move laterally over the top of the mold, and means for moving the mold from the feed device to the finishing device.

13. The combination with a gearing, of a conveyer, a mold carried thereby, a feed device for the mold, a packing device, a finishing device, and means for throwing the conveyer out of operation with relation to the remaining parts.

14. The combination with a gearing, of a conveyer, a mold carried thereby, a feed device for the mold, a packing device, a finishing device, and means for throwing the packing device out of operation without affecting the operation of the remaining parts of the machine.

15. The combination with a conveyer and molds carried thereby, a feed device arranged to empty into the mold, a packing device and a finishing device, supporting-bars for the finishing device provided with elongated slots, means on the finishing device for engaging the elongated slots and means for reciprocating the finishing device laterally within the slots.

16. The combination with a conveyer and a mold carried thereby, means for depositing material into the mold, means for packing it, a finishing device adapted to move over the mold, supporting-bars provided with elongated slots in which the finishing device is adapted to reciprocate, a bar positioned above the supporting-bars and a spring carried by the last-named bar and bearing upon the supporting-bars.

17. The combination with a conveyer and a mold carried thereby, means for depositing material into the mold, means for packing it, a finishing device adapted to reciprocate over the mold, vertical standards, supporting-bars vertically movable on said standards and supporting the finishing device, an adjustable bar above the supporting-bars, and a spring carried thereby and bearing on the supporting-bars.

In testimony whereof I affix my signature in presence of two witnesses.

WILLIAM R. WAKEFIELD.

Witnesses:
E. M. RHODES,
J. M. ELDER.